(12) United States Patent
Caskey et al.

(10) Patent No.: US 9,779,080 B2
(45) Date of Patent: Oct. 3, 2017

(54) TEXT AUTO-CORRECTION VIA N-GRAMS

(75) Inventors: Sasha P Caskey, New York, NY (US);
Dimitri Kanevsky, Ossining, NY (US);
James R. Kozloski, New Fairfield, CT (US); Tara N Sainath, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 13/544,941

(22) Filed: Jul. 9, 2012

(65) Prior Publication Data

US 2014/0012567 A1 Jan. 9, 2014

(51) Int. Cl.
*G06F 17/27* (2006.01)

(52) U.S. Cl.
CPC .......... *G06F 17/273* (2013.01); *G06F 17/276* (2013.01)

(58) Field of Classification Search
USPC ....................................................... 704/1–10
See application file for complete search history.

(56) References Cited

U.S. PATENT DOCUMENTS

| | | | |
|---|---|---|---|
| 6,618,697 B1 * | 9/2003 | Kantrowitz et al. | 703/22 |
| 8,601,019 B1 * | 12/2013 | Weininger et al. | 707/769 |
| 2003/0033288 A1 * | 2/2003 | Shanahan et al. | 707/3 |
| 2006/0256139 A1 * | 11/2006 | Gikandi | 345/689 |
| 2006/0274051 A1 * | 12/2006 | Longe et al. | 345/173 |
| 2008/0126075 A1 | 5/2008 | Thorn | |
| 2008/0195571 A1 | 8/2008 | Furuuchi et al. | |
| 2008/0294982 A1 * | 11/2008 | Leung et al. | 715/261 |
| 2010/0285435 A1 * | 11/2010 | Keim et al. | 434/157 |
| 2011/0201387 A1 * | 8/2011 | Paek et al. | 455/566 |
| 2011/0202836 A1 * | 8/2011 | Badger et al. | 715/702 |
| 2012/0166942 A1 * | 6/2012 | Ramerth et al. | 715/257 |

FOREIGN PATENT DOCUMENTS

WO 2011113057 A 9/2011

OTHER PUBLICATIONS

F. Ahmed et al., "Revised N-Gram based Automatic Spelling Correction Tool to Improve Retrieval Effectiveness", Polibits, 40, pp. 39-48, 2009.

* cited by examiner

*Primary Examiner* — Michael Ortiz Sanchez
(74) *Attorney, Agent, or Firm* — Patent Portfolio Builders PLLC

(57) ABSTRACT

An input text string is received that contains characters or words. The input text string can be completed or corrected using contact scores based on n-grams. In addition, a subsequent text string and a preceding text string for the input text string are also identified, again using n-gram scores. A corrected text string is created by inserting the preceding text string before the input text string and appending the subsequent text string after the input text string.

24 Claims, 3 Drawing Sheets

TEXT AUTO-CORRECTION VIA N-GRAMS

FIELD OF THE INVENTION

The present invention relates to electronic text input devices.

BACKGROUND OF THE INVENTION

Text-based communications using electronic devices such as computers and mobile phones require users of these devices to enter text using real or virtual key boards. Some devices provide for spoken text entry by translating spoken words into text. Existing methods of text entry have limitations that yield inaccuracies in the text. For example, the small size of virtual keyboards results in the selection of the wrong characters. In addition, text recognition software is not completely accurate due to variances in speech quality and voice tone. In certain applications such as text-based messaging, the desire by users is to accomplish text-based communication at speeds that rival spoken communications. However, the entry of text takes longer than speaking. Devices attempt to overcome errors and inaccuracies and to improve communication speeds by providing auto-complete and auto-correction functionality in association with text entry.

Text input devices such as cellular telephones or smartphones provide users with scrollable and selectable lists of words and auto-corrections upon receipt of only the first few letters of any given word. These devices utilize methods such as iTap and T9 to provide this functionality. These capabilities, however, only apply to single words and to the current word being entered. There is no predictive capability or applicability to groups of words or phrases. N-grams have been used extensively in speech recognition and natural language processing to assign probabilities to a current word, given the previous two words. The use of n-grams to auto complete and correct text inputs has been applied to the current word but not to corrections or predictions of previous and subsequent words or to phrases within a given categorical context. Therefore, systems and methods are desired that provide for the auto-correction and prediction of a current phrase as well as previous and subsequent phrases.

SUMMARY OF THE INVENTION

Exemplary embodiments of systems and methods in accordance with the present invention provide for the correction of an entered text phrase containing a plurality or words, i.e., "n" words, preferably using an n-gram language model to correct the series of "n" words. Therefore, a user has a higher likelihood of typing a sentence without errors and does not have to worry about misspelling either a current or previous word. This allows the user to type much faster, since the n-gram model corrects multiple words together. Currently, n-grams give probabilities of a word given the previous n−1 words. Given a current word or "phrase" entered by a user, the next n−1 words are predicted, allowing a user to auto-complete sentences and to minimize the number of words entered. In addition, words or phrases that precede a current set of n−1 words are predicted. For example, the n-gram determines probabilities of the n−1 words that may have preceded the entered text string, allowing the user to auto-complete preceding text strings as well as subsequent text strings.

The phrase that is currently being entered can also be predicted, auto-completed or corrected. For example, a user chooses "core" words from the desired text and enters these words. The phrase is then completed using just the entered core words. In one embodiment, the entered core words are displayed to the user in a suitable graphical user interface. The user selects an entered core word and indicates either a forward or backward direction from that core word for auto-completion of a phrase, for example using n-gram auto-completion. N-gram auto-completion auto-completes previous or subsequent text strings, e.g., characters, letters, words or phrases, depending on the indicated direction. In one embodiment, a plurality of candidate phrases or words are displayed, and the user scrolls through the plurality of displayed candidates, selecting one of the phrases or words. This process is repeated iteratively at each core word by selecting words to fill in the phrase and changing the direction of completion based on the context and expected behavior of the n-gram model.

In one embodiment, an n-gram model is used that starts with base probabilities for phrase completion derived from a bootstrap system. However, the n-gram probabilities dynamically adjust to a given user based on a vocabulary and phrase history associated with that user. In addition, the present invention allows for the user to add "n-grams" into the dictionary based on commonly used phrases.

In one embodiment, a user types two words, word 1 and word 2, that have high bigram and are accepted by the system. The user then types a third, word 3, such that the phrase word 1, word 2, word 3 has a relatively low 3-gram score. The system identifies a substitute word, substitute 1, that has a small hamming distance to word 1; however, the 3-gram probability associated with the phrase substitute 1, word 2, word 3 is much higher than 3-gram probability of the phrase word 1, word 2, word 3. Therefore, the input phrase is auto-corrected to the phrase substitute 1, word 2, word 3.

In one embodiment, back auto-correction, i.e., correction of preceding text strings including words and phrases, is done using topics that are identified dynamically. As the user enters words or phrases, a given categorical topic is identified that relates to the entered words, i.e., the words relate to a given subject. The suggested phrases and n-grams are adapted to the categorical topic. Candidate text strings are selected and suggestions are made that relate to this topic. The present invention also provides for the entry of words and phrases in different languages or a mix of different languages as well as the translation of phrases among different languages. For example, when multi-lingual users mix multiple languages when typing, the present invention performs auto-correction and prediction using words from different languages. In addition to spelling and content correction, the present invention provides for translation of a phrase entered in a first language into a second language. The combination of the modeling and the user interface allows a user to type a message in one language and view the output in a different language, making changes as the text strings are entered.

In one embodiment, systems and methods in accordance with the present invention are extended to correcting entire sentences and paragraphs. A template is provided to users, and the users fill in certain sentences and phrases in the template. Then the same n-gram model evaluates the parts of the template that have been filled and use this evaluation to hypothesize parts of phrases and even sentences that have not been written, completing the sentences, paragraphs and expressions of the users. For an example involving the writing of a letter of recommendation for a candidate, the template asks for certain adjectives to describe the candidate, e.g, smart, hard-working and creative, and uses these words to create a paragraph describing these qualities of the candidate in more detail. In one embodiment, the language model is narrowed to a domain for a given topic related to a form that a user is completing, and the method uses the entered information to complete the form.

DETAILED DESCRIPTION

Figure 1:
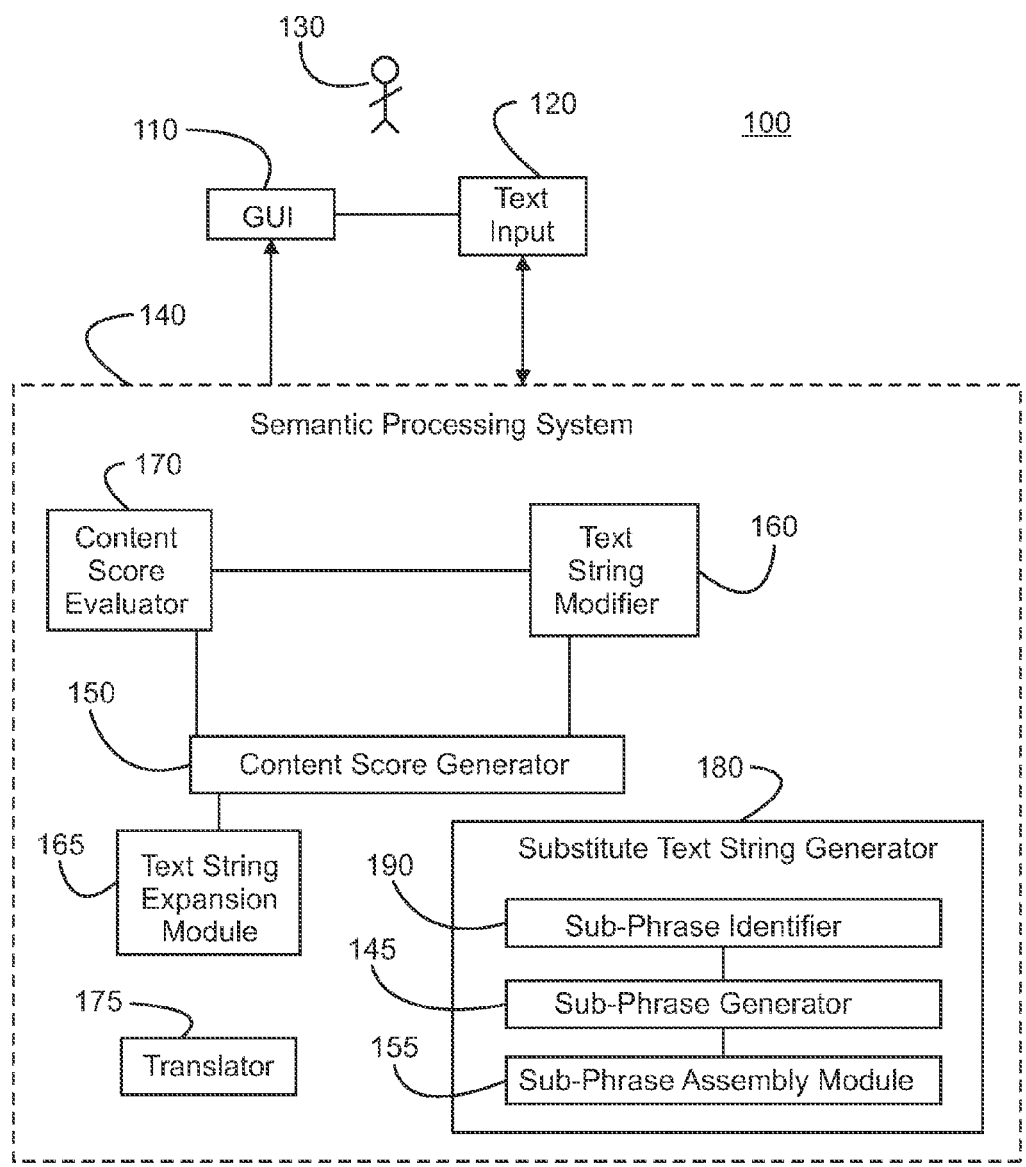
FIG. 1 is a schematic representation of an embodiment of a system for text auto-correction in accordance with the present invention.

Referring initially to FIG. 1, a system for text auto-correction 100 in accordance with exemplary embodiments of the present invention is illustrated. The system includes a text input interface device 120 to receive an input text string from a user 130. In general, any suitable device or system for accepting and entering text from a user into an electronic, computer-readable format can be used. Suitable text input devices include, but are not limited to, a computer keyboard, a speech recognition device, a computer touch screen, a handwriting input device and combinations thereof. These devices may be stand alone devices and devices that are used with or incorporated into a computing device such as a personal computer or netbook, a cellular telephone, a smartphone, a gaming console, portable gaming devices, electronic book readers and tablet computers, among other devices. The auto-correction system also includes a visual user interface 110 such as a display screen or graphical user interface. This visual user interface can be a specific, dedicated output device or can be incorporated into a single device with the text input interface. In one embodiment, the visual user interface is a graphical user interface displayed on a monitor of a computing device. In another embodiment, the visual user interface is a graphical user interface on a touch screen of a cellular telephone such as a smartphone.

A semantic processing module 140 is provided in communication with the text input device. The semantic processing module and all of the components and functionalities of this module can be configured as software executing on one or more computing systems, including distributed computing systems. In one embodiment, the semantic processing module is incorporated into the devices containing the text input device or user interface, for example as firmware. In one embodiment, the semantic processing module is configured as an application for a smartphone. In another embodiment, the semantic processing module is configured as a web-based and web-accessible service. The semantic processing module can also be incorporated into the device that is receiving the text strings or messages entered by the user, e.g., the receiving cellular phone associated with the intended recipient of the text string. The semantic processing module includes all of the necessary functionality to evaluate the input text string, to correct or to modify the input text string and to extend the input text string in at least two directions. Suitable directions include forward and backward through a string of text, up and down through a table of text, diagonally through a table of text, up and down through paragraphs of text and forward and back temporally through a history of text strings. The input text string is extended in at least two directions by identifying a subsequent text string and a preceding text string for the input text string. A corrected text string is created by inserting the preceding text string before the input text string and appending the subsequent text string after the input text string. The user interface is in communication with the text input interface and the semantic processing module to display the corrected text string to the user for review, approval and possible modification. The user can then accept the changes, request additional changes or modify the changes before acceptance.

In one embodiment, the semantic processing includes a content score generator 150 to generate content scores and to associate the content scores with any text strings entered, created or utilized by the system. These content scores express a probability of the accuracy of the content within a given text string. Therefore, the content of an input text string is evaluated to determine if a replacement of the input text string is more accurate, i.e., more accurately expresses the concepts, topics or information that the user wants to communicate. The content score also expresses an accuracy associated with the structure of the text string, e.g., semantics, grammar and spelling. Similarly, any preceding or subsequent text string selected for combination with the input text string is evaluated for the probability that it is accurately or properly combined with the input text string. These probabilities can be used to differentiate among a plurality of candidates for preceding and subsequent text strings. When an n-gram type system is used, the content scores are n-gram scores for a given text string or phrase having n characters, letters or words.

A content score evaluator 170 is provided in communication with the content score generator. The content score evaluator evaluates and compares content scores that are associated with text strings by the content score generator. A text string modifier 160 that is in communication with the content score evaluator creates the corrected input text string only if a corrected input text string content score is higher than the input text string content score as indicated by the content score evaluator. Therefore, correction and replacement is only made when the corrected text string is determined to be more accurate. The semantic processing module includes a substitute input text string generator 180 in communication with the content score generator to generate candidate substitute input text strings. Text strings can be parsed into sub-strings, such as smaller combinations or characters or letters, smaller combinations or words or sub-phrases. Therefore, the substitute input text string generator includes a sub-phrase identifier 190 to identify sub-phrases in the input text string. Each sub-phrase includes a number of characters that is less than the number of characters in the plurality of characters that form the input text string. A substitute sub-phrase generator 145 is included to generate a plurality of substitute sub-phrases. Each substitute sub-phrase is associated with one of the sub-phrases in the input text string. A given sub-phrase can have one or more substitute sub-phrases associated with it. A substitute sub-phrase assembly module 155 forms a plurality of candidate substitute input data strings. Each candidate substitute input data string comprising a unique combination of the input data string and at least one of the plurality of substitute sub-phrases, by substituting existing sub-phrases with an associated substitute sub-phrase. Since content scores are associated with any given text strings, these content scores can then be used to select a given candidate substitute input data string based on a probability of being more accurate.

The semantic processing module includes a text string expansion module 165 that is in communication with the content score generator. Based on the associated content scores and user input, the text string expansion module generates the subsequent text string and the preceding text string for the corrected input text string. In order to facilitate multiple languages and for the translation of text strings among these languages, the semantic processing module includes a language translator 175.

Figure 2:
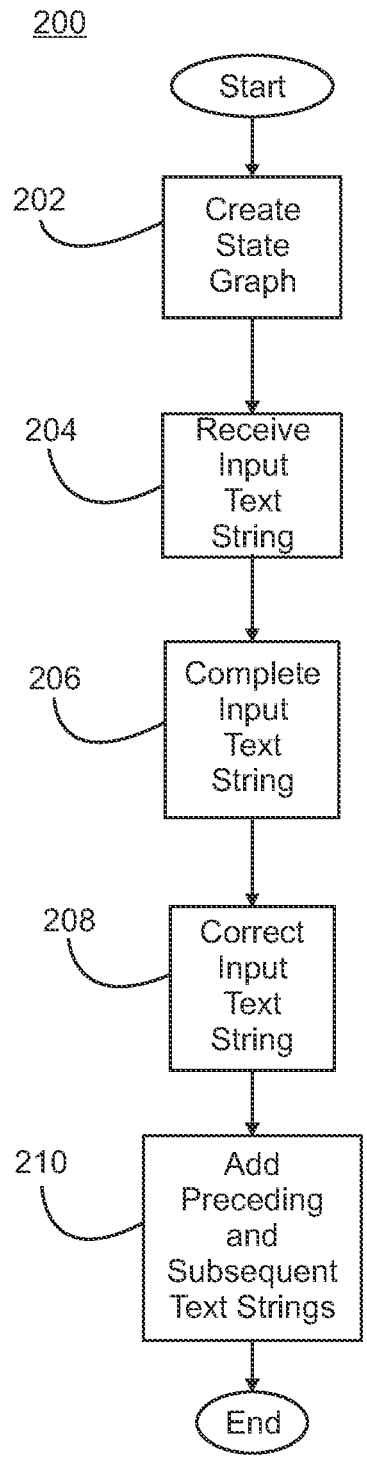
FIG. 2 is flow chart of an embodiment of a method for text auto-correction in accordance with the present invention.

Referring to FIG. 2, an exemplary embodiment of a method for text auto-correction 200 in accordance with the present invention is illustrated. A state graph is created 202 having a plurality of states and a plurality of transitions between pairs of states. Each state is a given text string, such as a phrase containing a plurality of words. Each transition between pairs of states expresses a probability that text strings in a given pair of states associated with that transition form a sequence of text strings. Therefore, paths through the state graph linking states form collections of text strings or phrases. Any given path or collection has an associated probability, e.g., an n-gram score, regarding the accuracy of that collection. Paths are chosen to maximize the accuracy. In addition, state graphs are created based on the type of text strings that are being received and can be associated with a given domain or categorical topic.

An input text string is received from a user 204, and the system can perform several tasks. These tasks include completing the input text string, correcting the input text string and adding to or extending the input text string. The text string can be a string of character or letters, a single word, a plurality of words forming a phrase or one or more core words that are core to the content of a given phrase but are not a complete phrase and do not have to be contiguous words in that phrase. If the input text string is not complete, for example it contains only one word for a given phrase or a plurality of core words from a given phrase, the method completes the input text string 206. In one embodiment, the input text string is received as at least one core word related to a given phrase or categorical topic. Completion of the input text string includes identification and creation of the input phrase containing the core word. This can be done by providing a plurality of alternatives to the user and having the user select one of the alternatives. In addition, content scores can be associated with each proposed complete input phrase, and the input phrase having the highest content score is selected.

Figure 3:
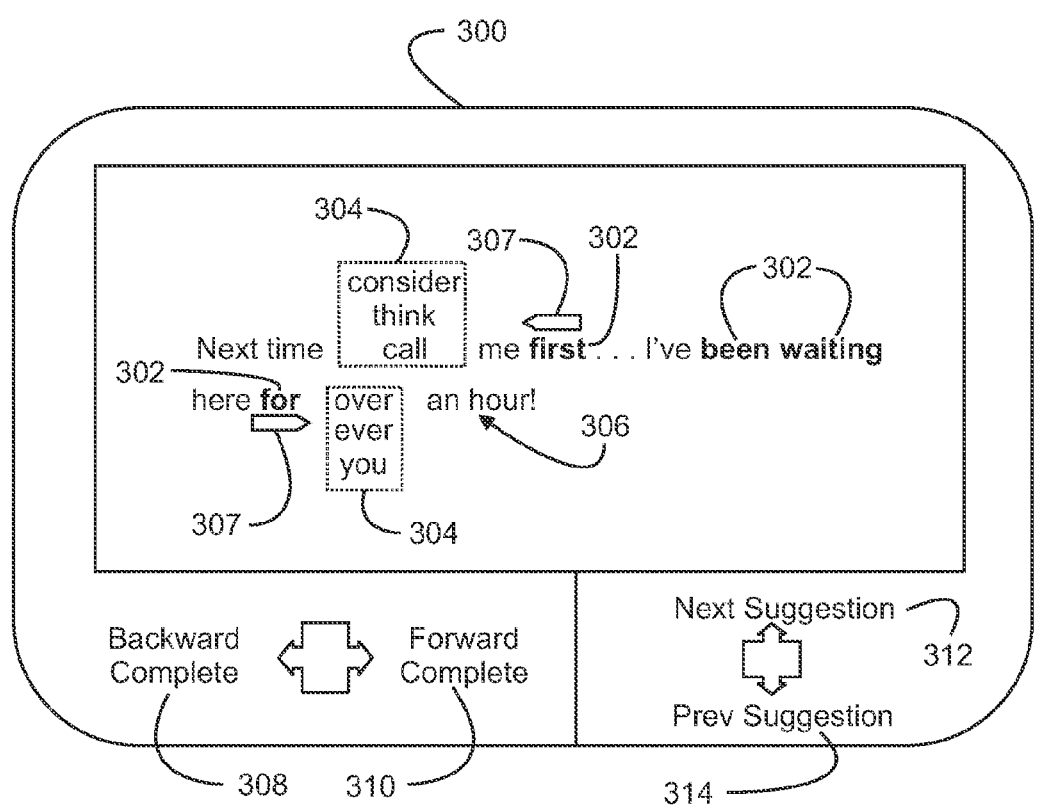
FIG. 3 is schematic representation of an embodiment of a graphical user interface for input text string completion in accordance with the present invention.

In one embodiment, a plurality of core words are received in the input text string, and the input phrase incorporates the plurality of core words such the core words are non-contiguous words in the input phrase. Referring to FIG. 3, in one embodiment, a graphical interface 300 is displayed to the user. This can be a dedicated graphical interface or can be a graphic user interface displayed on a screen such as a touch screen on a computing system associated with the user. The graphical interface displays the words 302 contained in the input text string and provides a suggested phrase 306 containing these words as both contiguous words and non-contiguous words. The user can highlight or select a given entered word and ask the system to complete the phrase going backwards 308 or forwards 310. The direction can also be indicated by arrows 307 associated with the words. In one embodiment, the system provides a group of suggestions 304 in the direction of completion indicated by the user. The user can then select one of the members in the suggested group. This can be accomplished using a next suggestion 312 and previous suggestion 314 set of commands. When the phrase is set, the user selects or sets the desired phrase, completing the input text string. When the input test string is a single word, this graphical user interface provides for adding a subsequent text string and a preceding text string to that word each in the form of a phrase having n−1 words.

If the input text string does not have to be completed or following completion of the input text string, the system corrects the input text string 208, by replacing misspellings or substituting more accurate phrases. In one embodiment, the input text string is a plurality of words forming an input phrase. This input phrase is replaced with a substitute input phrase based on content scores associated with the input phrase and the substitute input phrase. The content scores express a probability of accuracy of content. These content scores are preferably n-gram scores for phrases containing n-words. Therefore, an n-gram score is determined for the input text string and for the substitute input text string, or a plurality of candidate substitute input text strings, each having n characters, letters or words. In addition to replacing an input text string or input phrase, portions or sub-sets of the input text string can be replaced. In one embodiment, a plurality of partial input text strings or sub-phrases in the input phrase is identified. Each sub-phrase contains a number of words less than the plurality of words forming the input phrase. A plurality of substitute sub-phrases is then identified. Each substitute sub-phrase is associated with one of the sub-phrases in the input phrase, and a given sub-phrase can have more than one associated substitute sub-phrase. A plurality of candidate substitute input phrases is created using combinations of the input phrase with various substitutions of sub-phrases. Each candidate substitute input phrase is a unique combination of the input phrase and at least one of the plurality of substitute sub-phrases. In order to determine which candidate substitute input phrase to use, a content score is assigned to each one of the candidate substitute input phrases. Preferably, this is an n-gram score. The candidate substitute input phrase having a highest content score is then selected as the substitute input phrase.

If no content score associated with a candidate substitute input phrase is higher than the content score associated with the original input phrase, no substitution is made. Therefore, a content score is also assigned to the original input phrase, and the input phrase is replaced with the substitute input phrase only if a substitute input phrase content score is higher than an input phrase content score. This comparison is used for any proposed substitute of an input text string.

The method for text auto-correction then adds preceding and subsequent text strings to the input text string 210. This includes the addition of a set of characters or a word before and after the input text string. In one embodiment, the input text string is a single word, and phrases are added both before and after this word that each contains a plurality of words. In one embodiment, the number of words and this plurality of words is one less than the dimension of the n-gram used to associate content scores to the phrases and text strings. In another embodiment, the input text string, preceding text string and subsequent text string are all of equivalent length, e.g., the n-gram length. In order to add text strings both before and after the input text string, a subsequent text string and a preceding text string for the input text string are identified. A corrected text string is then created by inserting the preceding text string before the input text string and appending the subsequent text string after the input text string.

In one embodiment, the input text string is a single word. A subsequent text string is identified that contains a plurality of words forming a subsequent phrase, and a preceding text string is identified that contains a plurality of words forming a preceding phrase. The single word from the input text string can form a part of both the preceding phrase and the subsequent phrase or can be used to link the two phrases together. In one embodiment, the created state graph can be used to identify the appropriate preceding and subsequent phrases. The input text string is located in an input state. The input text string can be the entire contents of the input state or a portion of the contents, e.g., a single word in a phrase contained within the input state. Subsequent and preceding text strings are then identified in other states of the state graph by identifying potential states and analyzing the probabilities, e.g., n-gram scores, associated with the transitions between the input state and those other states. A subsequent state in the state graph containing comprising the subsequent text string is identified such that a transition between the input state and the subsequent state represents the highest probability associated with the sequence of the input text string followed by the subsequent text string. A preceding state in the state graph containing the preceding text string is identified such that a transition between the input state and the preceding state represents the highest probability associated with the sequence of the preceding text string followed by the input text string. Therefore, the highest probability path is selected through the state graph, which yields the highest probability sequence of text strings or phrases. When the input text string is only a portion of the input state, the input state can also be used to complete the input text string.

Categorical topics, or domains of topics, can also be used to identify text strings related to the input text string by common topic. In one embodiment, the input text string contains a plurality of words, and a categorical topic related to the plurality of words is determined. The subsequent text string is a plurality of words forming a subsequent phrase within the categorical topic, and the preceding text string is a plurality of words forming a preceding phrase within the categorical topic.

The method for auto-text correction also provides for translation of the input text string or the preceding and subsequent text strings related to the input text string. In one embodiment, the input text string is a single word comprising a first language which is translated into a second language. A subsequent text string containing a plurality of words in the second language that form a subsequent phrase is identified, and a preceding text string containing a plurality of words in the second language that form a preceding phrase are also identified. All of the text strings are then combined to form a translated output. This can be used for text communications between users in different languages. In one embodiment, an input text string containing a plurality of words forming an input phrase in a first language is received. This input phrase is replaced with a substitute input phrase based on content scores associated with the input phrase and the substitute input phrase expressing a probability of accuracy of content. The substitute input phrase is then translated into the second language.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for text auto-correction in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for text auto-correction, the method comprising:
   receiving an input text string on an electronic text input interface device, the input text string comprising N words and a categorical topic;
   generating a subsequent text string comprising a plurality of N−1 subsequent words forming a subsequent phrase within the categorical topic by determining probabilities that the N−1 subsequent words follow the N words in the input test string;
generating a preceding text string comprising a plurality of N−1 preceding words forming a preceding phrase for the input text string within the categorical topic by determining probabilities that the N−1 preceding words following precede the N words in the input test string;
creating a corrected text string by inserting the preceding phrase before the input text string and appending the subsequent phrase after the input text string; and
displaying the corrected text string on the electronic text input interface device.

2. The method of claim 1, wherein:
the step of receiving the input text string further comprises receiving an input text string comprising the N words forming an input phrase; and
the method further comprises replacing the input phrase with a substitute input phrase comprising N words based on N-gram content scores associated with the input phrase comprising the N words and the substitute input phrase expressing a probability of accuracy of content.

3. The method of claim 2, wherein the step of replacing the input phrase with the substitute input phrase further comprises:
identifying a plurality of sub-phrases in the input phrase, each sub-phrase comprising a number of words less than the N words forming the input phrase;
identifying a plurality of substitute sub-phrases, each substitute sub-phrase associated with one of the sub-phrases in the input phrase;
forming a plurality of candidate substitute input phrases, each candidate substitute input phrase comprising a unique combination of the input phrase and at least one of the plurality of substitute sub-phrases;
assigning a content score to the input phrase and to each one of the candidate substitute input phrases;
selecting the candidate substitute input phrase having a highest content score as the substitute input phrase; and
replacing the input phrase with the substitute input phrase only if a substitute input phrase content score is higher than an input phrase content score.

4. The method of claim 1, wherein:
the step of receiving the input text string comprises:
receiving the N words comprising a first language; and
translating the N words to a second language; and
the steps of generating the subsequent text string and the preceding text string further comprise generating a subsequent text string comprising a plurality of N−1 subsequent words in the second language forming a subsequent phrase and generating a preceding text string comprising a plurality of N−1 preceding words in the second language forming a preceding phrase.

5. The method of claim 1, wherein:
the step of receiving the input text string further comprises receiving an input text string comprising a plurality of N words forming an input phrase in a first language; and
the method further comprises:
replacing the input phrase with a substitute input phrase based on content scores associated with the input phrase and the substitute input phrase expressing a probability of accuracy of content; and
translating the substitute input phrase into a second language.

6. The method of claim 1, wherein the method further comprises locating the input text string in a state graph comprising a plurality of states and a plurality of transitions between pairs of states, each state comprising a given text string and each transition comprising a probability that text strings in a given pair of states associated with that transition comprise a sequence of text strings.

7. The method of claim 6, wherein:
the step of locating the input text string further comprises locating the input text string in an input state; and
the steps of generating a subsequent text string and a preceding text string further comprise:
generating a subsequent state comprising the subsequent text string such that a transition between the input state and the subsequent state comprises a highest probability associated with a sequence comprising the input text string followed by the subsequent text string; and
generating a preceding state comprising the preceding text string such that a transition between the input state and the preceding state comprises a highest probability associated with a sequence comprising the preceding text string followed by the input text string.

8. The method of claim 1, wherein:
the step of receiving the input text string further comprises receiving at least one core word; and
the method further comprises completing the input phrase containing the core word.

9. The method of claim 8, wherein:
step of receiving at least one core word further comprises receiving a plurality of core words; and
the input phrase comprises the plurality of core words such the core words are non-contiguous words in the input phrase.

10. A non-transitory computer-readable storage medium containing a computer-readable code that when read by a computer causes the computer to perform a method for text auto-correction, the method comprising:
receiving an input text string on an electronic text input interface device, the input text string comprising N words and a categorical topic;
generating a subsequent text string comprising a plurality of N−1 subsequent words forming a subsequent phrase within the categorical topic by determining probabilities that the N−1 subsequent words follow the N words in the input test string;
generating a preceding text string comprising a plurality of N−1 preceding words forming a preceding phrase for the input text string within the categorical topic by determining probabilities that the N−1 preceding words following precede the N words in the input test string;
creating a corrected text string by inserting the preceding phrase before the input text string and appending the subsequent phrase after the input text string; and
displaying the corrected text string on the electronic text input interface device.

11. The non-transitory computer-readable medium of claim 10, wherein:
the step of receiving the input text string further comprises receiving an input text string comprising the N words forming an input phrase; and
the method further comprises replacing the input phrase with a substitute input phrase comprising N words based on content scores associated with the input phrase and the substitute input phrase expressing a probability of accuracy of content.

12. The non-transitory computer-readable medium of claim 11, wherein the step of replacing the input phrase with the substitute input phrase further comprises:
  identifying a plurality of sub-phrases in the input phrase, each sub-phrase comprising a number of words less than the N words forming the input phrase;
  identifying a plurality of substitute sub-phrases, each substitute sub-phrase associated with one of the sub-phrases in the input phrase;
  forming a plurality of candidate substitute input phrases, each candidate substitute input phrase comprising a unique combination of the input phrase and at least one of the plurality of substitute sub-phrases;
  assigning a content score to each one of the candidate substitute input phrases; and
  selecting the candidate substitute input phrase having a highest content score as the substitute input phrase.

13. The non-transitory computer-readable medium of claim 12, wherein:
  the method further comprises assigning a content score to the input phrase; and
  the step of replacing the input phrase further comprises replacing the input phrase with the substitute input phrase only if a substitute input phrase content score is higher than an input phrase content score.

14. The non-transitory computer-readable medium of claim 10, wherein:
  the step of receiving the input text string comprises:
  receiving the N words comprising a first language; and
  translating the N words to a second language; and
  the steps of generating the subsequent text string and the preceding text string further comprise generating a subsequent text string comprising a plurality of N−1 subsequent words in the second language forming a subsequent phrase and generating a preceding text string comprising a plurality of N−1 preceding words in the second language forming a preceding phrase.

15. The non-transitory computer-readable medium of claim 10, wherein:
  the method further comprises locating the input text string in an input state of a state graph comprising a plurality of states and a plurality of transitions between pairs of states, each state comprising a given text string and each transition comprising a probability that text strings in a given pair of states associated with that transition comprise a sequence of text strings; and
  the steps of generating a subsequent text string and a preceding text string further comprise:
  generating a subsequent state comprising the subsequent text string such that a transition between the input state and the subsequent state comprises a highest probability associated with a sequence comprising the input text string followed by the subsequent text string; and
  generating a preceding state comprising the preceding text string such that a transition between the input state and the preceding state comprises a highest probability associated with a sequence comprising the preceding text string followed by the input text string.

16. The non-transitory computer-readable medium of claim 10, wherein:
  the method further comprises determining the categorical topic related to the N words.

17. The non-transitory computer-readable medium of claim 10, wherein:
  the step of receiving the input text string further comprises receiving a plurality of core words; and
  the method further comprises completing the input phrase comprising the plurality of core words such the core words are non-contiguous words in the input phrase.

18. A method for text auto-correction, the method comprising:
  receiving an input text string on an electronic text input interface device, the input text string comprising N words;
  locating the input text string in an input state of a state graph comprising a plurality of states and a plurality of transitions between pairs of states, each state comprising a given phrase and each transition comprising an N-gram score expressing a probability that phrases in a given pair of states associated with that transition comprise a sequence of phrases, the input state comprising an input phrase containing each input word in the N words;
  identifying a subsequent state in the state graph comprising a subsequent phrase comprising a plurality of N−1 subsequent words such that a transition between the input state and the subsequent state comprises an N-gram score expressing highest probability associated with a sequence comprising the input phrase followed by the subsequent phrase;
  identifying a preceding state in the state graph comprising a preceding phrase comprising a plurality of N−1 preceding words such that a transition between the input state and the preceding state comprises an N-gram score expressing highest probability associated with a sequence comprising the preceding phrase followed by the input phrase; and
  creating a corrected text string by inserting the preceding phrase before the input phrase and appending the subsequent phrase after the input phrase; and
  displaying the corrected text string on the electronic text input interface device.

19. A system for text auto-correction, the system comprising:
  a text input interface device to receive an input text string from a user, the text input string comprising N words;
  a semantic processing module in communication with the text input device to use an N-gram language model to evaluate the input text string and extend the input text string in at least two directions by generating a subsequent text string comprising a plurality of N−1 subsequent words forming a subsequent phrase by determining probabilities from the N-gram language model that the N−1 subsequent words follow the N words in the input text string and generating a preceding text string comprising a plurality of N−1 preceding words forming a preceding phrase for the input text string by determining probabilities from the N-gram language model that the N−1 preceding words precede the N words in the input text string and creating a corrected text string by inserting the preceding phrase before the input text string and appending the subsequent phrase after the input text string; and
  a user interface in communication with the text input interface and the semantic processing module to display the corrected text string to the user for approval.

20. The system of claim 19, wherein the semantic processing module further comprises:
  a content score generator to generate content scores and to associate the content scores with text strings, the content scores expressing a probability of accuracy of content within a given text string;

a content score evaluator in communication with the content score generator to evaluate and to compare content scores associated with text strings; and a text string modifier in communication with the content score evaluator to create the corrected input text string only if a corrected input text string content score is higher than the input text string content score.

21. The system of claim 20, wherein the content scores comprise N-gram scores for the input text string comprising N characters.

22. The system of claim 19, wherein the semantic processing module further comprises a substitute input text string generator in communication with the content score generator to generate candidate substitute input text strings.

23. The system of claim 22, wherein the substitute input text string generator comprises:

a sub-phrase identifier to identify sub-phrases in the input text string, each sub-phrase comprising a number of characters less than a plurality of characters forming the input text string;

a substitute sub-phrase generator to generate a plurality of substitute sub-phrases, each substitute sub-phrase associated with one of the sub-phrases in the input text string; and a substitute sub-phrase assembly module to form a plurality of candidate substitute input data strings, each candidate substitute input data string comprising a unique combination of the input data string and at least one of the plurality of substitute sub-phrases.

24. The system of claim 19, wherein the semantic processing module further comprises a text string expansion module in communication with the content score generator to generate the subsequent text string and the preceding text string for the corrected input text string.

* * * * *